United States Patent [19]
Zenda

[11] Patent Number: 5,430,457
[45] Date of Patent: * Jul. 4, 1995

[54] CRT/FLAT PANEL DISPLAY CONTROL SYSTEM

[75] Inventor: Hiroki Zenda, Hamura, Japan

[73] Assignee: Kabushiki Kaisha Toshiba, Kawasaki, Japan

[*] Notice: The portion of the term of this patent subsequent to Sep. 27, 2011 has been disclaimed.

[21] Appl. No.: 315,489

[22] Filed: Sep. 30, 1994

Related U.S. Application Data

[63] Continuation of Ser. No. 90,005, Jul. 12, 1993, abandoned, which is a continuation of Ser. No. 882,256, May 8, 1992, abandoned, which is a continuation of Ser. No. 652,392, Feb. 6, 1991, abandoned, which is a continuation of Ser. No. 517,443, Apr. 25, 1990, abandoned, which is a continuation of Ser. No. 207,986, Jun. 17, 1988, abandoned.

[30] Foreign Application Priority Data

Jun. 19, 1987 [JP] Japan ................. 62-152701
Nov. 18, 1987 [JP] Japan ................. 62-289501
Nov. 18, 1987 [JP] Japan ................. 62-289502

[51] Int. Cl.6 ............................................. G09G 3/02
[52] U.S. Cl. ......................................... 345/3; 345/132; 345/200
[58] Field of Search .................. 345/1, 3, 60, 63, 100, 345/112, 118, 127, 128, 130, 132, 200

[56] References Cited

U.S. PATENT DOCUMENTS 3,928,845 12/1975 Clark .
3,967,268 7/1976 Roberts .
4,121,283 10/1978 Walker .
4,399,524 8/1983 Muguruma et al. .
4,422,163 12/1983 Oldenkamp .
4,430,649 2/1984 Leininger .
4,454,593 6/1984 Fleming et al. .
4,536,856 8/1985 Hiroishi .
4,566,005 1/1986 Apperley et al. .
4,574,279 3/1986 Roberts .
4,611,203 9/1986 Criscimagna et al. .
4,628,534 12/1986 Marshall .
4,727,362 2/1988 Rackley et al. .
4,730,186 3/1988 Koga et al. .
4,751,502 6/1988 Ishii et al. .
4,760,387 7/1988 Ishii et al. .
4,763,279 8/1988 Kellam et al. .
4,764,975 8/1988 Inoue et al. .
4,769,852 9/1988 Hashimoto et al. .
4,891,634 1/1990 Ina et al. .
4,926,166 5/1990 Fujisawa et al. .
4,980,678 12/1990 Zenda .
4,990,902 2/1991 Zenda .
4,990,904 2/1991 Zenda .
5,111,190 5/1992 Zenda .

FOREIGN PATENT DOCUMENTS 0326275 8/1989 European Pat. Off. .
2213953 9/1973 Germany .
48-40335 6/1973 Japan .

(List continued on next page.)

OTHER PUBLICATIONS

EGAWonder, Technologies Inc., Advertisement, PC Magazine, vol. 6, No. 3, Feb. 10, 1987.

(List continued on next page.)

Primary Examiner—Richard Hjerpe
Assistant Examiner—Steven J. Saras
Attorney, Agent, or Firm—Finnegan, Henderson, Farabow, Garrett & Dunner

[57] ABSTRACT

According to this invention, in a display system having a CRT controller for arbitrarily and selectively display-driving a plasma display and a CRT display, display fonts inherent to the displays are prepared, and a display font corresponding to the display is selectively used and displayed in accordance with a display to be display-driven. The fonts include a plurality of types of graphics and text fonts, and are selectively used. As the text font, a single font and a double font are selectively used. When a display mode of the plasma display having a ratio of the number of dots in the vertical direction to that in the horizontal direction different from that of the CRT display is set, a specific raster of the display screen is scanned twice to stretch an image.

9 Claims, 14 Drawing Sheets

FOREIGN PATENT DOCUMENTS

| | | |
|---|---|---|
| 55-150422 | 5/1982 | Japan . |
| 60-233690 | 11/1985 | Japan . |
| 63-132281 | 6/1988 | Japan . |
| 2053533 | 2/1981 | United Kingdom . |

OTHER PUBLICATIONS

EGAWonder, ATI Technologies, Edition 1.1, Jan. 1987.

PEGA 2 User's Guide, 50208 Rev. 4, 1986, Paradise Systems, Inc.

Criscimagna et al., "An AC Plasma Operating as the CRT Video Display for an IBM PC," Proceedings of the Society for Information Display, vol. 26, No. 1, pp. 59–64, New York, 1985.

"Field-Controlled Character Graphics for Display Station," IBM Technical Disclosure Bulletin, vol. 27, No. 12, pp. 6899–6901, New York, May 1985.

Patent Abstracts of Japan, vol. 7, No. 234 (P-230), Oct. 18, 1983 and JP-A-58 123 118 (Fujitsu K.K.), Jul. 22, 1983.

Patent Abstracts of Japan, vol. 10, No. 154 (P-463), Jun. 22, 1986, publication no. 61007963 (Fujitsu K.K.), Jan. 14, 1986.

Toshiba T3100 Personal Computer Manual, May 1986, pp. 6-22 through 6-29.

IBM Enhanced Graphics Adapter–IBM Enhanced Graphics–(Aug. 2, 1984).

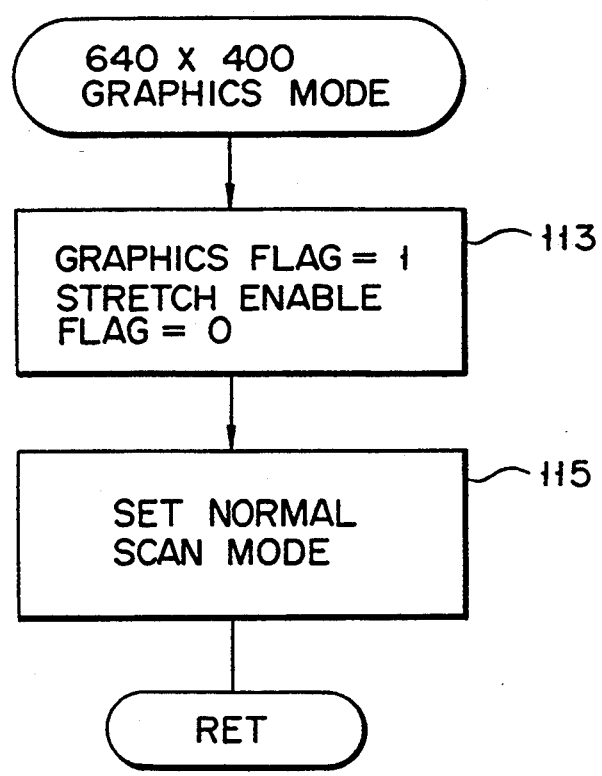
F I G. 4

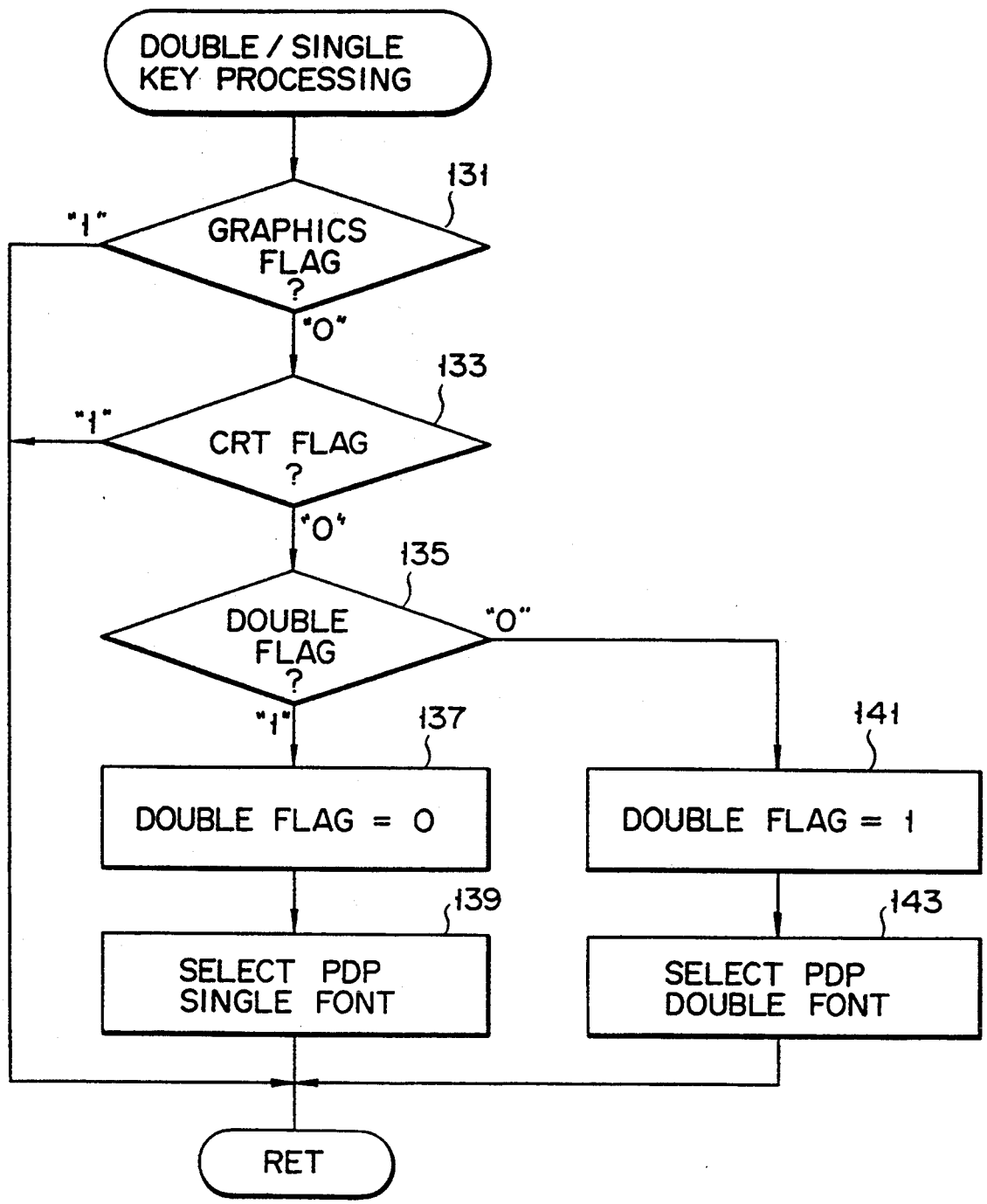
F I G. 6

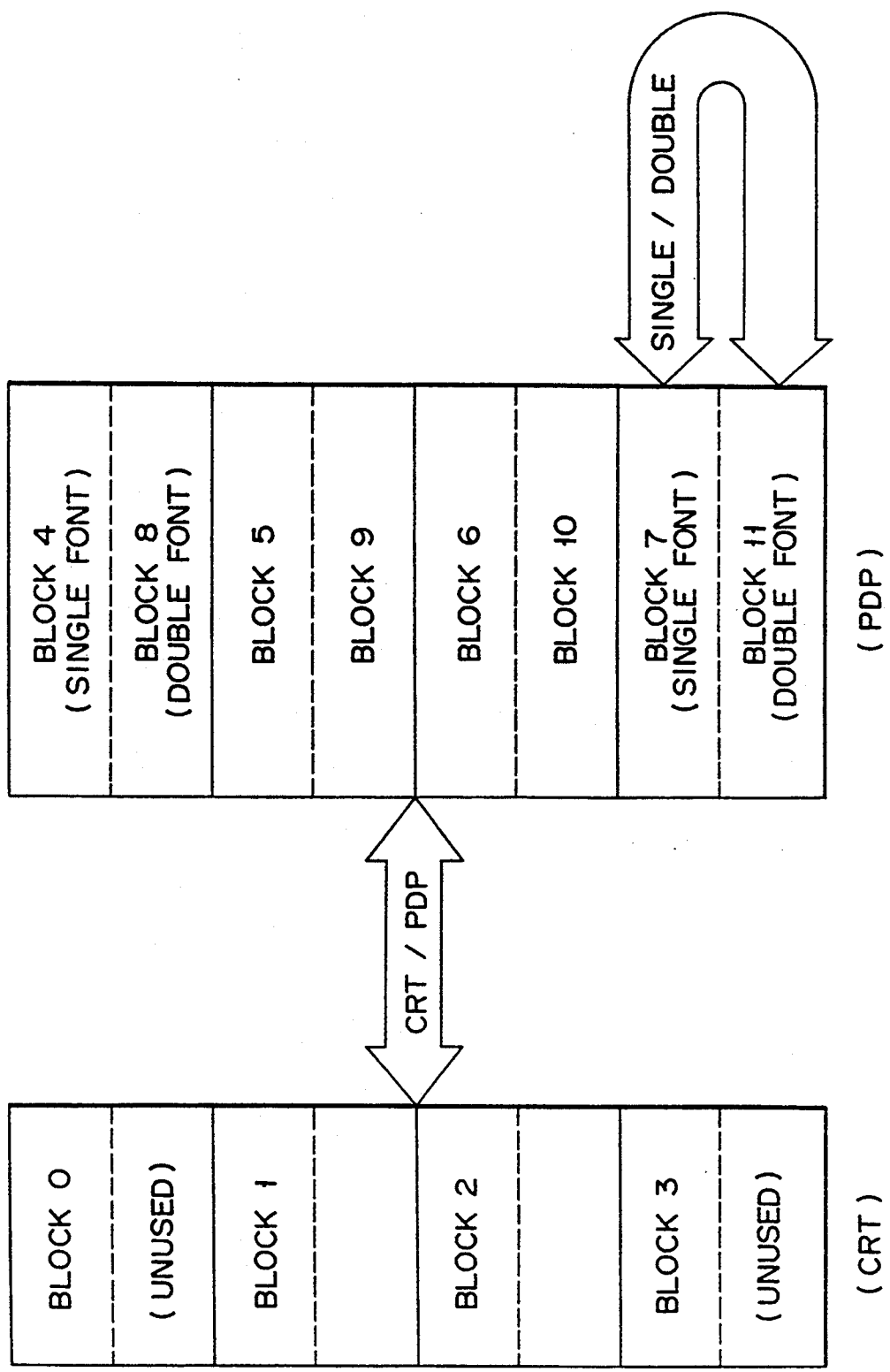
F I G. 12

| | DISPLAY MODE \ FLAG | FG | FC | FD | FE | FS |
|---|---|---|---|---|---|---|
| M1 | TEXT – PDP – S | 0 | 0 | 0 | 0 | 0 |
| M2 | TEXT – PDP – D | 0 | 0 | 1 | 0 | 0 |
| M3 | TEXT – CRT | 0 | 1 | × | 0 | 0 |
| M4 | GRAPH – PDP – 400 | 1 | 0 | × | 0 | 0 |
| M5 | GRAPH – CRT – 400 | 1 | 1 | × | 0 | 0 |
| M6 | GRAPH – PDP – 350 | 1 | 0 | × | 1 | 0/1 |
| M7 | GRAPH – CRT – 350 | 1 | 1 | × | × | × |

FIG. 13

CRT/FLAT PANEL DISPLAY CONTROL SYSTEM

This application is a continuation of application Ser. No. 08/090,005, filed Jul. 12, 1993, now abandoned, which was a continuation of application Ser. No. 07/882,256 filed May 8, 1992 and now abandoned, which was a continuation of application Ser. No. 07/652,392 filed Feb. 6, 1991 and now abandoned, which was a continuation of application Ser. No. 07/517,443 filed Apr. 25, 1990 and now abandoned, which was a continuation of application Ser. No. 07/207,986 filed Jun. 17, 1988 and now abandoned.

BACKGROUND OF THE INVENTION

1. Field of the Invention

The present invention relates to a display controller for CRT and flat panel display apparatus, such as plasma display apparatuses.

2. Description of the Related Art

Along with the development of microcomputers, a variety of personal computers have been developed. Some microcomputers employ, flat panel display devices, such as plasma display apparatuses, as a display apparatus. The plasma display apparatus is controlled by a controller for a CRT display apparatus (to be referred to as a CRT controller hereinafter).

Meanwhile, a cathode ray tube (CRT) display apparatus for is widely used as a display apparatus for personal computers. Therefore, a variety of application programs have been developed CRT display apparatuses. A demand has arisen for effective use of the application programs, developed for CRT display apparatuses, in conjunction with the plasma display apparatuses. That is, a plasma display apparatus is used as a main display apparatus, and a CRT display apparatus is connected as an option, so that the two types of display apparatuses are selectively used in accordance with application programs. In this case, an error occurs when an application program for a CRT display apparatus executes a display command using a plasma display apparatus. This error results due to the fact that the CRT display apparatus can desirably change a dot size, and the plasma display apparatus, however, has a fixed dot size. Therefore, when display is made in various display modes of different display resolutions, the CRT display apparatus can cope with this, but the plasma display apparatus cannot. For this reason, when a ratio of the number of dots in the vertical direction to that in the horizontal direction of a display screen of the CRT display apparatus is different from that of the plasma display apparatus, an actual image on the display screen of the plasma display apparatus is distorted, resulting in poor visual recognition property. In addition, a display font of the plasma display apparatus is also distorted, resulting in poorer visual recognition property.

SUMMARY OF THE INVENTION

It is an object of the present invention to provide a CRT/flat panel display controller, which can obtain an optimal display font in either CRT or flat panel display apparatus, and is free from distortion of a display screen regardless of different display resolutions.

In order to achieve the above object, according to the present invention, a plasma display apparatus which can perform display in a display mode including text and graphics modes, and a display timing of which is controlled by a CRT controller, comprises: stretch designation means for instructing stretching of a display screen of the plasma display apparatus; means for discriminating in response to a stretch instruction from the stretch designation means whether or not a current display mode is a stretch-enable display mode; and image stretch means for, when the means for discriminating the stretch-enable display mode determines that the current display mode is the stretch-enable display mode, scanning a specific raster of the display screen of the plasma display apparatus twice so as to stretch a display image.

BRIEF DESCRIPTION OF THE DRAWINGS

Other objects and features of the present invention will be apparent from the following description taken in connection with the following figures in which:

FIG. 4 is a flow chart snowing in detail 640×400 graphics mode processing shown in FIG. 2B;

FIG. 6 is a flow chart showing in detail double/single switching processing shown in FIG. 2C;

FIG. 12 is a view showing a storage example of a display character font in a text mode; and FIG. 13 is a view showing the relationship between various display modes and flags in the embodiment of the present invention.

DETAILED DESCRIPTION OF THE PREFERRED EMBODIMENTS

An embodiment of the present invention will now be described with reference to the accompanying drawings.

Figure 1:
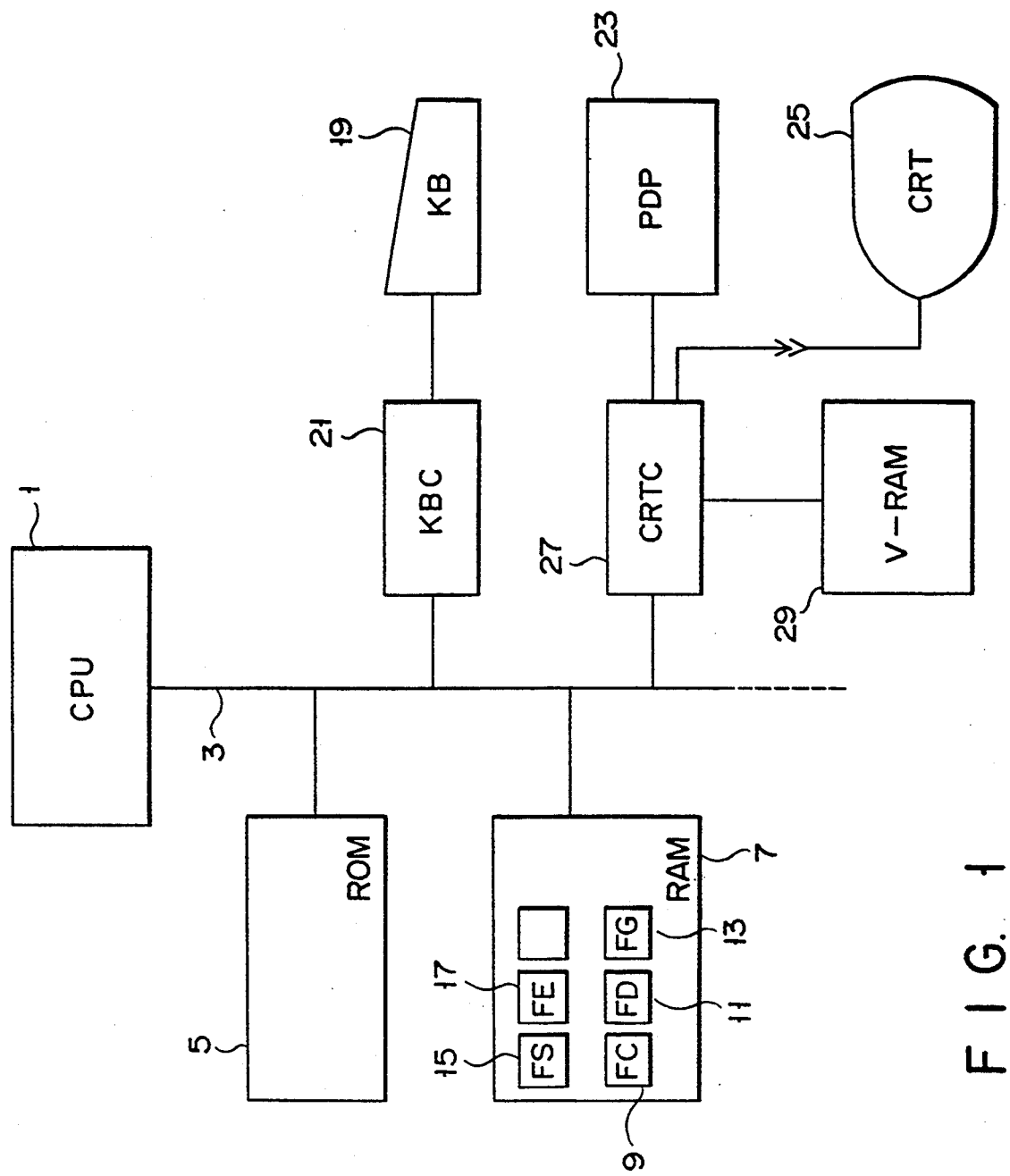
FIG. 1 is a block diagram showing an embodiment of the present invention.

FIG. 1 is a block diagram showing an embodiment of the present invent ion.

Referring to FIG. 1, central processing unit (CPU) 1 is connected to system bus 3, and executes processing as shown in FIGS. 2A through 9. Read only memory (ROM) 5 is connected to system bus 3, and stores processing programs as shown in FIGS. 2A through 9, executed by CPU 1, such as basic input/output program (BIOS) for a CRT display apparatus, a BIOS for a keyboard, and the like. ROM 5 also stores font pattern data having predetermined matrix arrangements (in this embodiment, 8×8 dots, 8×14 dots, and 8×16 dots). Main memory 7 comprises a random access memory (RAM), and is connected to system bus 3. RAM 7 has registers storing flag data. The flag data are as follows:

i) CRT flag (FC) 9 indicating a display mode for a CRT display apparatus (to be referred to as a CRT mode) or for a flat panel display apparatus such as a plasma display apparatus;

ii) double flag (FD) 11 indicating whether a display character font in a text mode (to be described later) is a single font of a reference line width (1-dot width; thin line) or a double font of a wider line width (bold) than the single font;

iii) graphics flag (FG) 13 indicating a text or graphics mode;

iv) stretch flag (FS) 15 indicating whether or not a display character font in the graphics mode is also in a stretch mode;

v) stretch enable flag (FE) 17 indicating an enable/-disable state of a stretch operation Keyboard (KB) 19 is connected to system bus 3 via keyboard controller (KBC) 21, and supplies data corresponding to a depressed key to CPU 1 via system bus 3. In this embodiment, keyboard 19 includes a double/single switch key for switching a display character font (single font/double font) in a text mode, a PDP switch key for instructing the switching from the CRT mode to a PDP mode, a CRT switch key for instructing the switching from the PDP mode to the CRT mode, a stretch switch key for switching a display mode (stretch mode/normal mode) of plasma display (PDP) 23 when the system in a graphics mode, and the like.

PDP 23 displays image data from V-RAM 29 under the control of CRT controller (CRTC) 27 in the same manner as in the optimal CRT display apparatus (CRT) 25. Display modes of the PDP include display mode A of 640 (horizontal)×350 (vertical) dots shown in FIG. 10A, and default display mode B of 640 (horizontal)×400 (vertical) dots shown in FIG. 10B. In display modes A and B shown in FIGS. 10A and 10B, the numbers of dots in the vertical direction are different at a ratio of 350:400=7:8. The ratio of the number of dots in the vertical direction to that of dots in the horizontal direction on the display screen (horizontal×vertical=640×400) of default display mode B coincides with the CRT screen shown in FIG. 10C. Therefore, a figure displayed in default display mode B of FIG. 10B coincides with a figure displayed on the display screen of CRT 25 shown in FIG. 10C. However, in display mode A shown in FIG. 10A, the figure is compressed in the vertical direction at a ratio of 7:8.

Figures 11A, 11B:
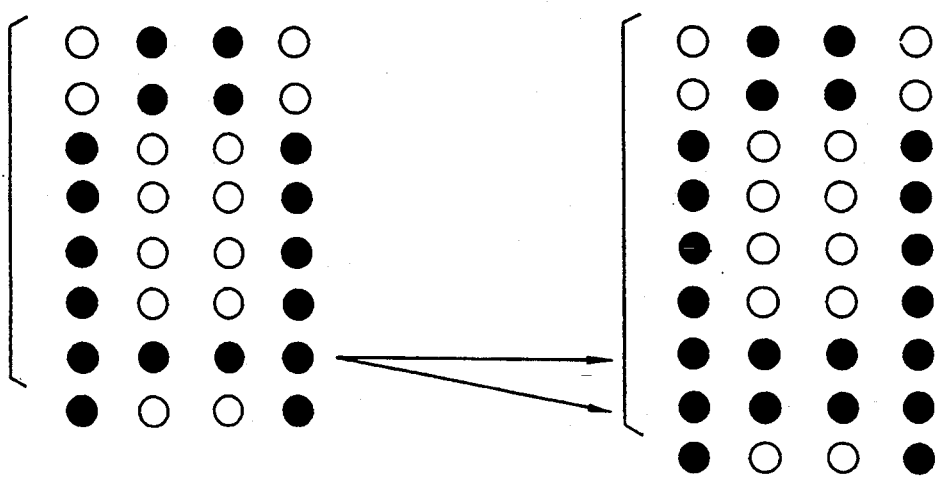
FIGS. 11A and 11B are views showing detailed stretch processing.

In the embodiment of the present invention, raster stretch by 7th-dot double scan is performed as shown in FIGS. 11A and 11B only in display mode A in accordance with stretch display control (to be described later), so that a displayed figure in display mode A is approximated to that on CRT display 25.

FIG. 12 shows a storage state of display character fonts used in the text mode. In this embodiment, in the text mode, specific memory plane A (e.g., second plane of first to fourth planes) on V-RAM 29 is used as a display character font storage section for CRT 25, and another specific plane (e.g., third plane) B is used as a display character font storage section for PDP 23. For PDP 23, two types of fonts, e.g., single and double fonts, are stored in units of blocks. FIG. 13 snows the relationship between various display modes and flags in the embodiment of the present invention. Symbols in FIG. 13 nave the following meanings:

TEXT-PDP-S: representing a case wherein the text mode and the single-font display mode are selected in the PDP.

TEXT-PDP-D: representing a case wherein the text mode and the double-font display mode are selected in the PDP.

TEXT-CRT: representing a case wherein the text mode is selected in the CRT.

GRAPH-PDP-400: representing a case wherein the graphics mode and a display screen (default screen) in display mode B (640×400) are selected in the PDP.

GRAPH-CRT-400: representing a case wherein the graphics mode and a display screen (default screen) in display mode B (640×400) are selected in the CRT.

GRAPH-PDP-350: representing a case wherein the graphics mode and a display screen (default screen) in display mode A (640×350) are selected in the PDP.

GRAPH-CRT-350: representing a case wherein the graphics mode and a display screen (default screen) in display mode A (640×350) are selected in the CRT.

The embodiment of the present invention will be described hereinafter with reference to FIGS. 1 through 13.

Figure 2A:
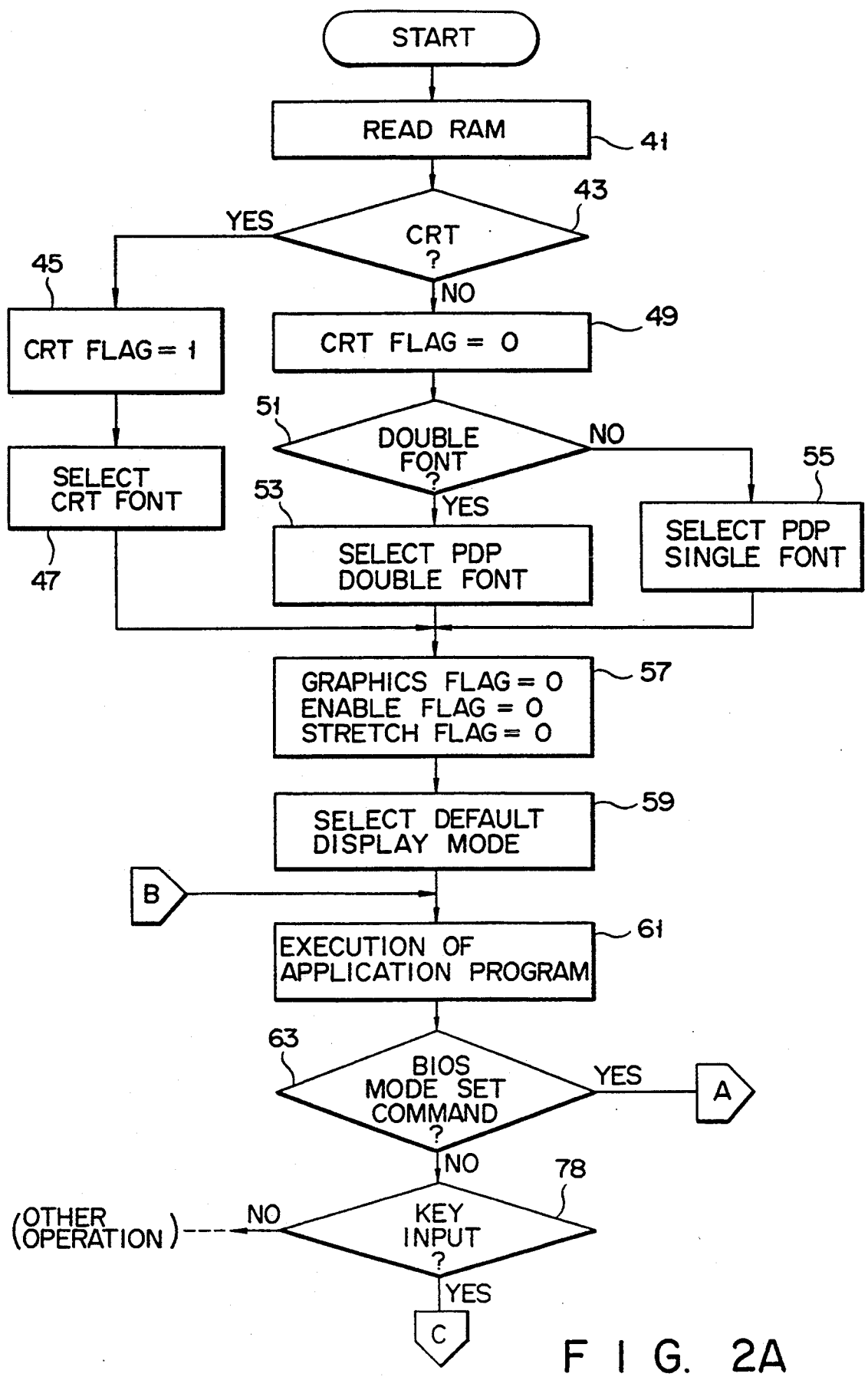
FIGS. 2A through 2C are flow charts of a display control processing program stored in a ROM shown in FIG. 1.
Figure 2B:
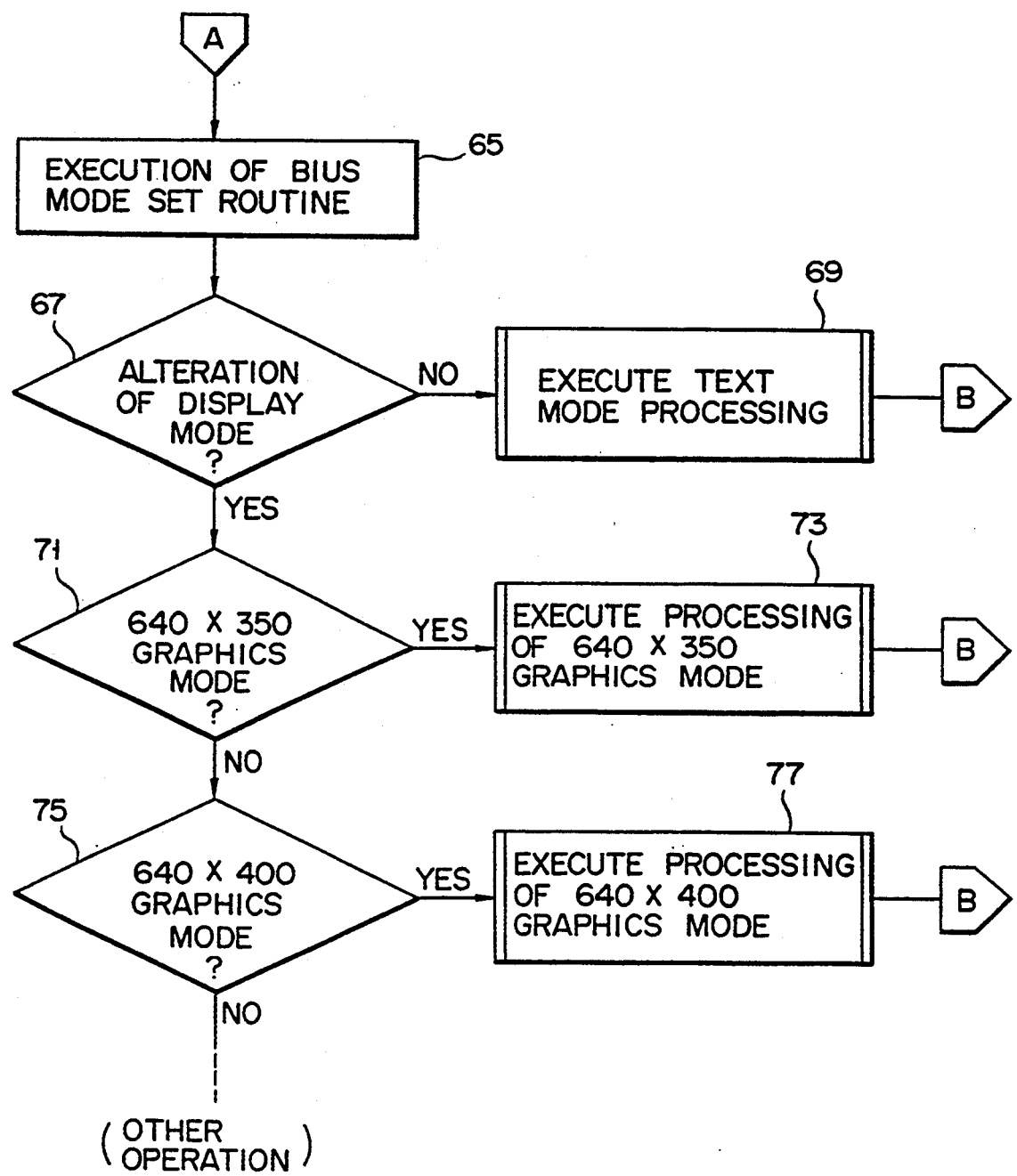
Figure 2C:
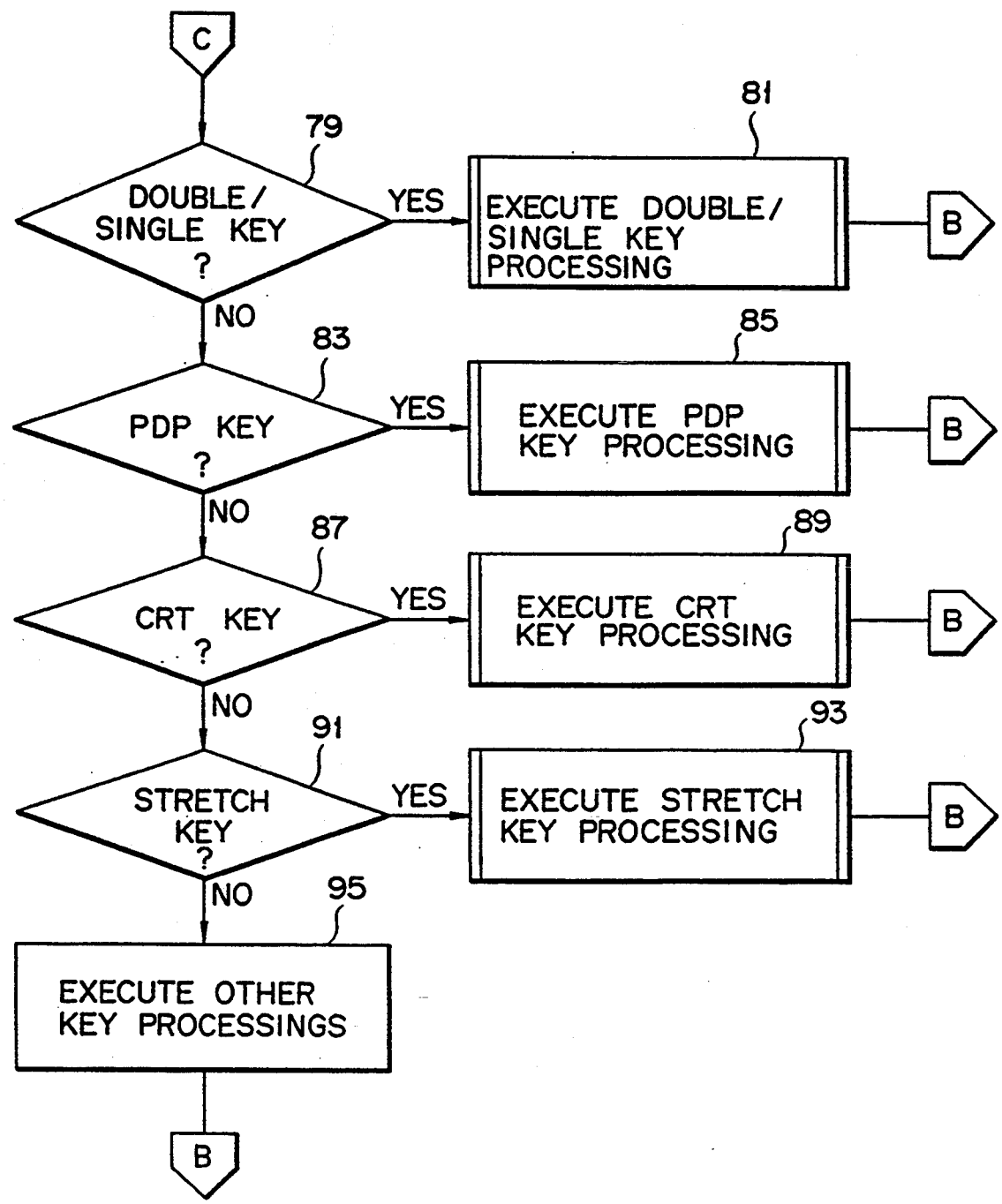

FIGS. 2A–2C illustrate a flow chart showing processing of the PDP/CRT controller of the present invention. In step 41 in FIG. 2A, CPU 1 reads out the content of RAM 7. CPU 1 checks in step 43 if the contents read out from RAM 7 corresponds to the CRT mode or PDP mode. If YES is the result of step 43, CPU 1 sets "1" representing the CRT mode in FC 9 in step 45. In step 47, CPU 1 selects a CRT font.

However, if NO is the result of step 43, CPU 1 sets "0" in FC 9 in step 49, and the flow advances to step 51. In step 51, CPU 1 refers to RAM 7 to check if a display character font in use is a single or double font. If a single font is used in step 51, CPU 1 selects one of blocks 4 through 7 in FIG. 12. However, if a double font is used in step 51, CPU 1 selects one of blocks 8 through 11 in FIG. 12.

In this embodiment, assume that the PDP mode is selected as a display mode for a display, and a single font is selected as a display character font.

Since the display mode and the display character font are respectively the PDP mode and the single font, FG 13, FE 17, and FS 15 are set to be "0". CPU 1 selects a default display mode as the PDP display mode (in this embodiment, 640×400 dot matrix shown in FIG. 10B) based on a CRT.BIOS stored in ROM 5 in step 59. CPU 1 then executes an application program in step 61. CPU 1 checks in step 63 if a BIOS mode set command is generated during execution of the application program. If YES is the result of step 63, the flow advances to step 65, and CPU 1 executes a BIOS mode set routine. CPU 1 checks in step 67 if an alteration request of a display mode is input. If NO is the results of step 67, CPU 1 executes text mode processing in step 69.

Figure 10A:
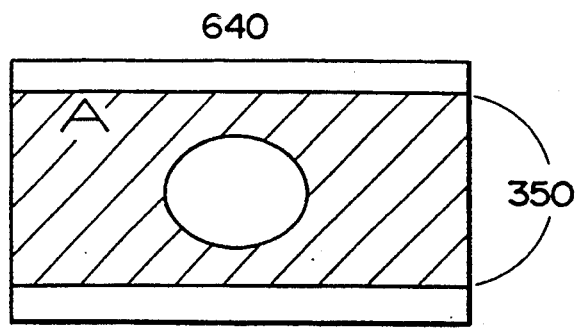
FIGS. 10A through 10C are views showing display screens of CRT and plasma display apparatuses.

If YES is the result of step 67, however, CPU 1 checks in step 71 if the display screen (640×350 dots) in display mode A shown in FIG. 10A is set. If YES is the result of step 71, CPU 1 executes 640×350 graphics mode processing in step 73.

However, if NO is the result of step 71, CPU 1 checks in step 75 if a 640×400 graphics mode is set. If YES is the result of step 75, CPU 1 executes 640×400 graphics mode processing in step 77.

On the other hand, if NO is the result of step 63, it is checked in step 78 if a key input at keyboard 19 is made.

If YES is the result of step 78, it is checked in step 79 shown in FIG. 2C if the double font/single font switch key is depressed. If YES is the result of step 79, double font/single font switching processing is executed in step 81.

However, if NO is the result of step 79, CPU 1 checks in step 83 if a key operated at keyboard 19 is the PDP key instructing switching from the CRT mode to the PDP mode. If YES is the result of step 83, CPU 1 executes a PDP key processing subroutine in step 85. However, if NO is the result of step 83, it is checked in step 87 if the operated key is the CRT key for instructing switching from the PDP mode to the CRT mode. If YES is the result of step 87, CPU 1 executes a CRT key processing subroutine in step 89. However, if NO in step 87, CPU 1 checks in step 91 if the operated key is the stretch key for switching the display mode (stretch mode/normal mode) of PDP 23. If YES is the result of step 91, CPU 1 executes a stretch key processing subroutine in step 93.

On the other hand, if NO is the result of step 91, CPU 1 executes processing for other input keys in step 95.

The above-mentioned processing subroutines will be described below in detail with reference to FIGS. 3 through 9.

Figure 3:
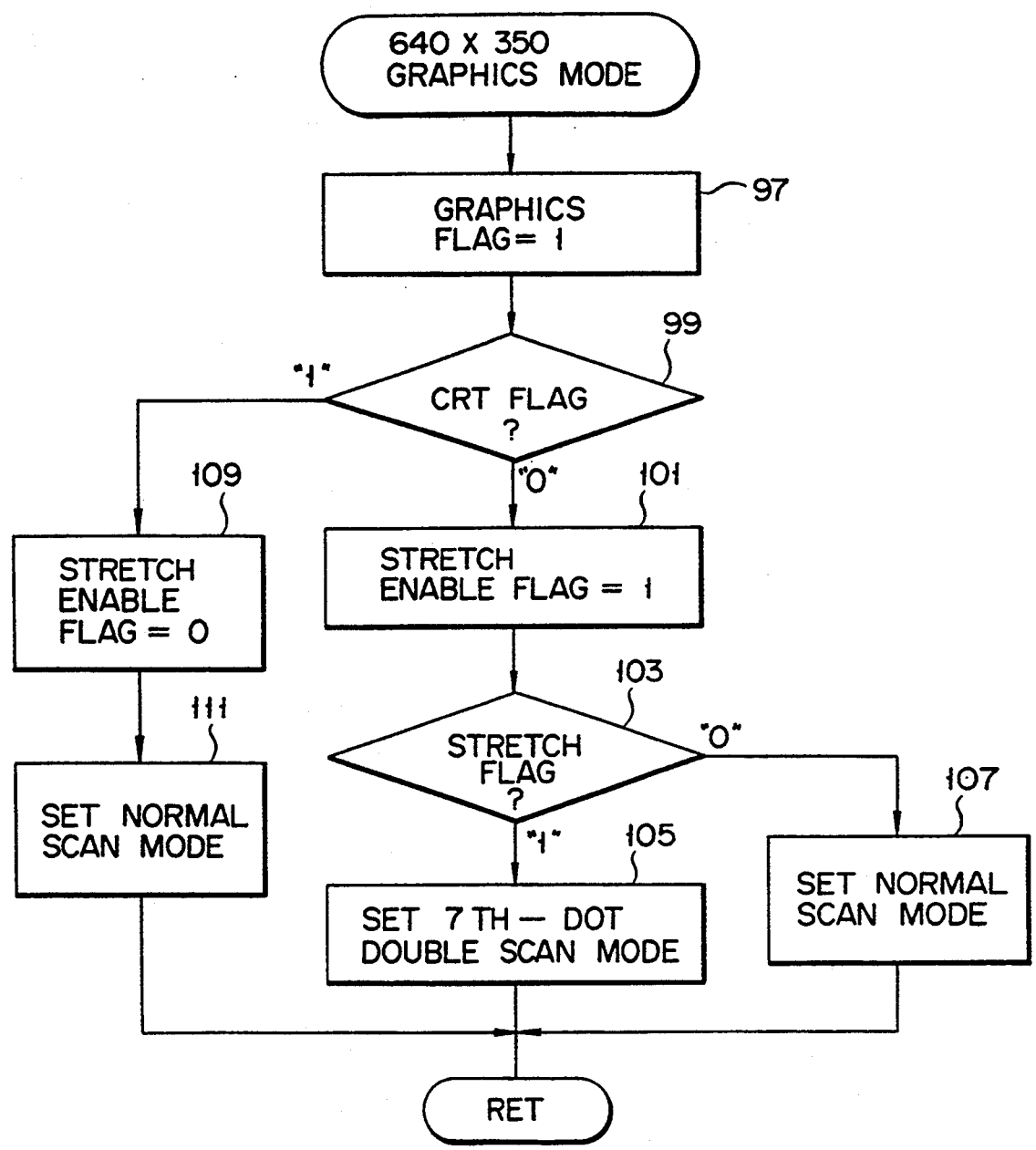
FIG. 3 is a flow chart showing in detail 640×350 graphics mode processing shown in FIG. 2B.
Figure 5:
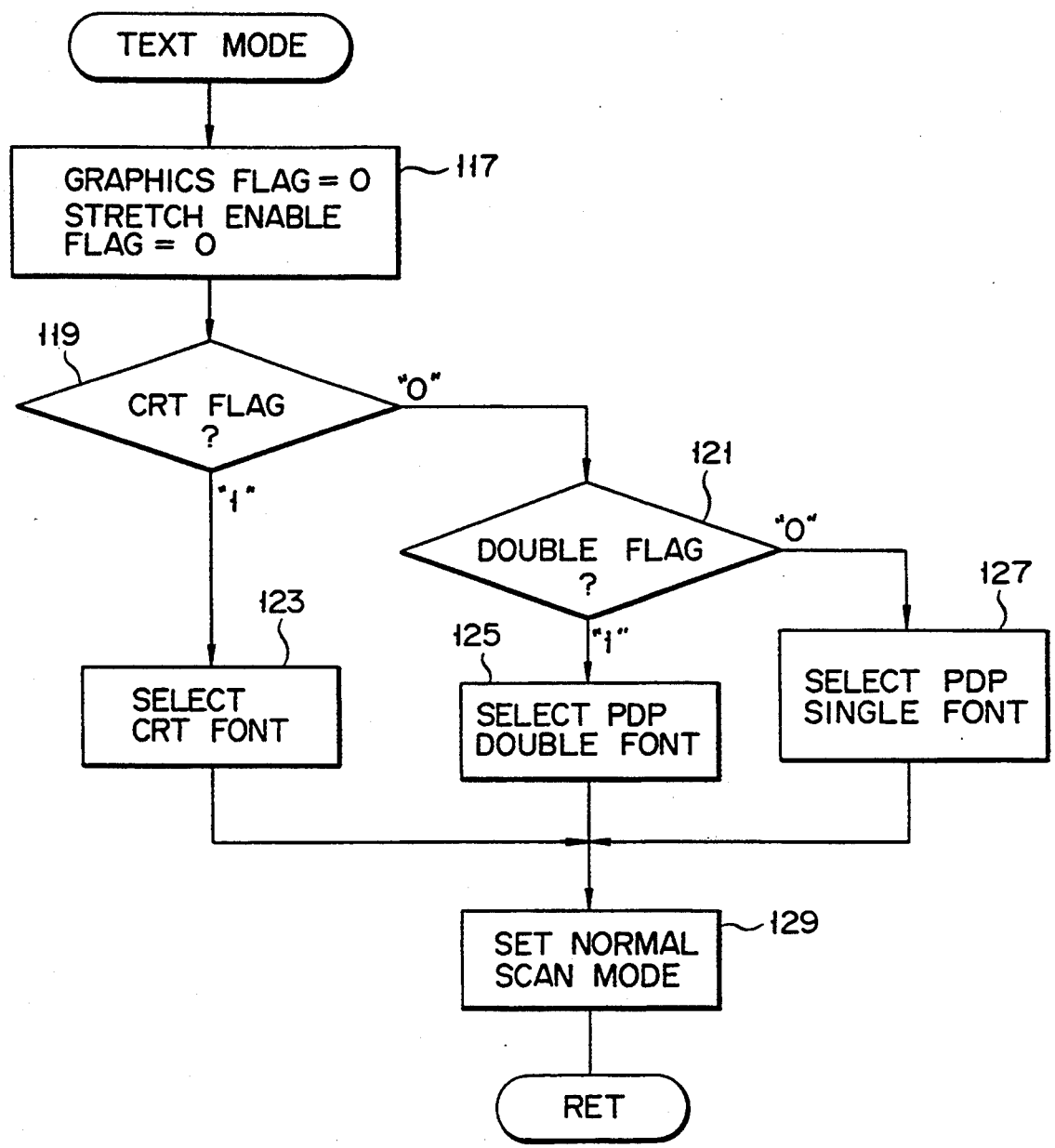
FIG. 5 is a flow chart showing in detail a text mode shown in FIG. 2B.
Figure 10B:
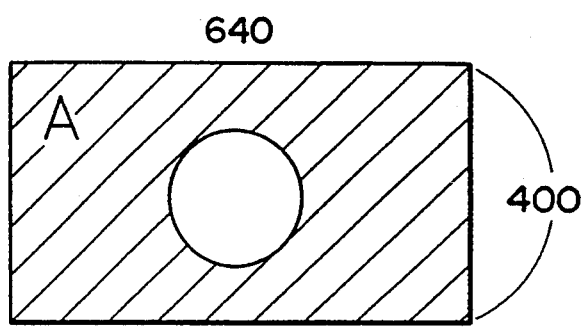
Figure 10C:
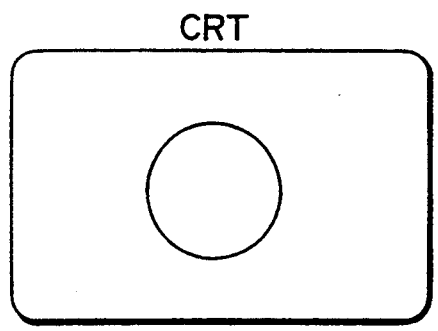

FIG. 3 snows a subroutine of processing of the display screen in display mode A. If CPU 1 determines in step 71 in FIG. 2B that the 640×350 graphics mode is set, it alters the display screen (640×400 dots) in default display mode B shown in FIG. 10B to the display screen (640×350 dots) in display mode A shown in FIG. 10A. More specifically, in step 97 in FIG. 3, CPU 1 sets "1" representing the graphics mode in FG 13, and thereafter, refers to FC 9 in step 99. If it is determined in step 99 that "1" representing the display mode of CRT 25 (CRT mode) is set in FC 9, CPU 1 sets "0" indicating a stretch disable mode in FE 17 in step 109. As a result, CPU 1 performs CRT display control in the normal mode for CRT 25. FIG. 10C shows a display screen format on CRT 25 in this case, and FIG. 13 shows the states of flags.

However, if it is determined in step 99 that "0" indicating the display mode for PDP 23 is set in FC 9, CPU 1 sets "1" indicating a stretch enable mode in FE 17 in step 101. In step 103, CPU 1 refers to FS 15. If it is determined in step 103 that "0" indicating the normal mode is set in FS 15, CPU 1 performs display control in the normal mode for PDP 23 in step 107. FIG. 10A shows a display screen format on PDP 23 in this case, and FIG. 13 shows states of flags. (In this case, FS="0" in M6.) In this case, since "0" is set in FS 15, stretch processing is not performed, and an image is displayed on PDP 23 using the display screen (640×350 dots) in display mode A shown in FIG. 10A. The display screen (640×350 dots) in display mode A show in FIG. 10A has no correspondence in real image with CRT 25, but can clearly display a font.

If it is determined in step 103 that "1" indicating the stretch mode (raster stretch mode) is set in FS 15, CPU 1 performs PDP display control in the stretch mode for PDP 23. FIG. 10B snows a display screen format on PDP 23 in this case, and FIG. 13 snows states of flags. (In this case, FS="1" in M6.) That is, a 7th dot of display image data (FIG. 11A) read out from V-RAM 29 and displayed on PDP 23 is scanned twice to achieve raster stretch processing. As a result, an image is expanded and displayed in the same dot matrix as in the display screen format (640×400 dots) in the default display mode shown in FIG. 10B. (350 dots in the vertical direction are expanded to 400 dots.)

With the PDP stretch function described above, in a system which can arbitrarily and selectively display-drive the PDP and CRT mechanisms, if a display screen format of PDP 23 is different from that of CRT 25, an operator can select a more appropriate display mode, base on an image presented to the operator by the display device.

If it is determined in step 75 in FIG. 2B that the display screen (640×400 dots) in display mode B is set, CPU 1 then executes a 640×400 graphics mode processing subroutine shown in FIG. 4. More specifically, in step 113 in FIG. 4, CPU 1 sets "1" indicating the graphics mode in FG 13, and sets "0" indicating the stretch disable mode in FE 17. In step 115, CPU 1 performs PDP display control in the normal mode. FIG. 10B shows the display screen format on PDP 23 in this case, and M4 in FIG. 13 shows the flag states. In this case, FE 17 is set to be "0" indicating the stretch disable mode, and stretch processing is disabled. Therefore, an image is displayed on PDP 23 using the display screen (640×400 dots) in display mode A shown in FIG. 10B.

If it is determined in step 67 in FIG. 2B that no alteration of the display mode is made, CPU 1 executes a text mode processing subroutine in step 69. More specifically, in step 117 in FIG. 5, CPU 1 sets "0" in FG 13 and FE 17. In step 119, CPU 1 refers to FC 9. If FC 9 is set to be "1" indicating the CRT mode, a CRT font (blocks 0 through 3 in FIG. 12) is selected as a display character font in step 123. FIG. 10C snows the display screen format on CRT 25 in this case, and M3 in FIG. 13 snows the flag states.

If it is determined in step 119 that the CRT flag is set to be "0", CPU 1 determines that the PDP mode is CPU 1 then refers to FD 11 in step 121. If FD 11 is set to be "1" indicating a double font, CPU 1 selects the double font (blocks 8 through 11 in FIG. 12) as a display character font in step 125. If it is determined in step 121 that FD 11 is set to be "0", CPU 1 determines that the single font is set, and selects a single font (blocks 4 through 7 in FIG. 12) as a display character font in step 127. FIG. 10B shows the display screen format on PDP 23 in this case, and M2 (double font) and M1 (single font) in FIG. 13 show flag states. In step 129, CPU 1 sets a normal scan mode.

By selection of single font/double font, a the most readable display character font, for various conditions of ambient lighting, can be selected as desired by the operator.

As described above, the display mode (graphics mode/text mode) is set and altered.

If it is determined in step 79 in FIG. 2C that the operated key is the double/single switch key for switching the display character font (single font/double font) in the text mode, double/single switching processing shown in FIG. 6 is executed. That is, it is checked in step 131 if FG 13 is set to be "0" indicating the text mode. If "0", it is checked in step 133 if FC 9 is set to be "0" indicating the PDP mode. If "0", the flow advances to step 135, and CPU 1 refers to FD 11. If it is determined in step 135 that FD 11 is set to be "1" indicating a double font, CPU 1 sets "0" in FD 11 in step 137, and selects a single font as a display character font in accordance with the content of FD 11 in step 139.

If it is determined in step 135 that FD 11 is set to be "0" indicating a single font, CPU 1 rewrites FD 11 to be "1" in step 141, and selects blocks 8 through 11 in FIG. 12 based on the content of FD 11 in step 143.

In this manner, each time the double/single switch key is operated, the display character fonts are alternately switched.

Figure 7:
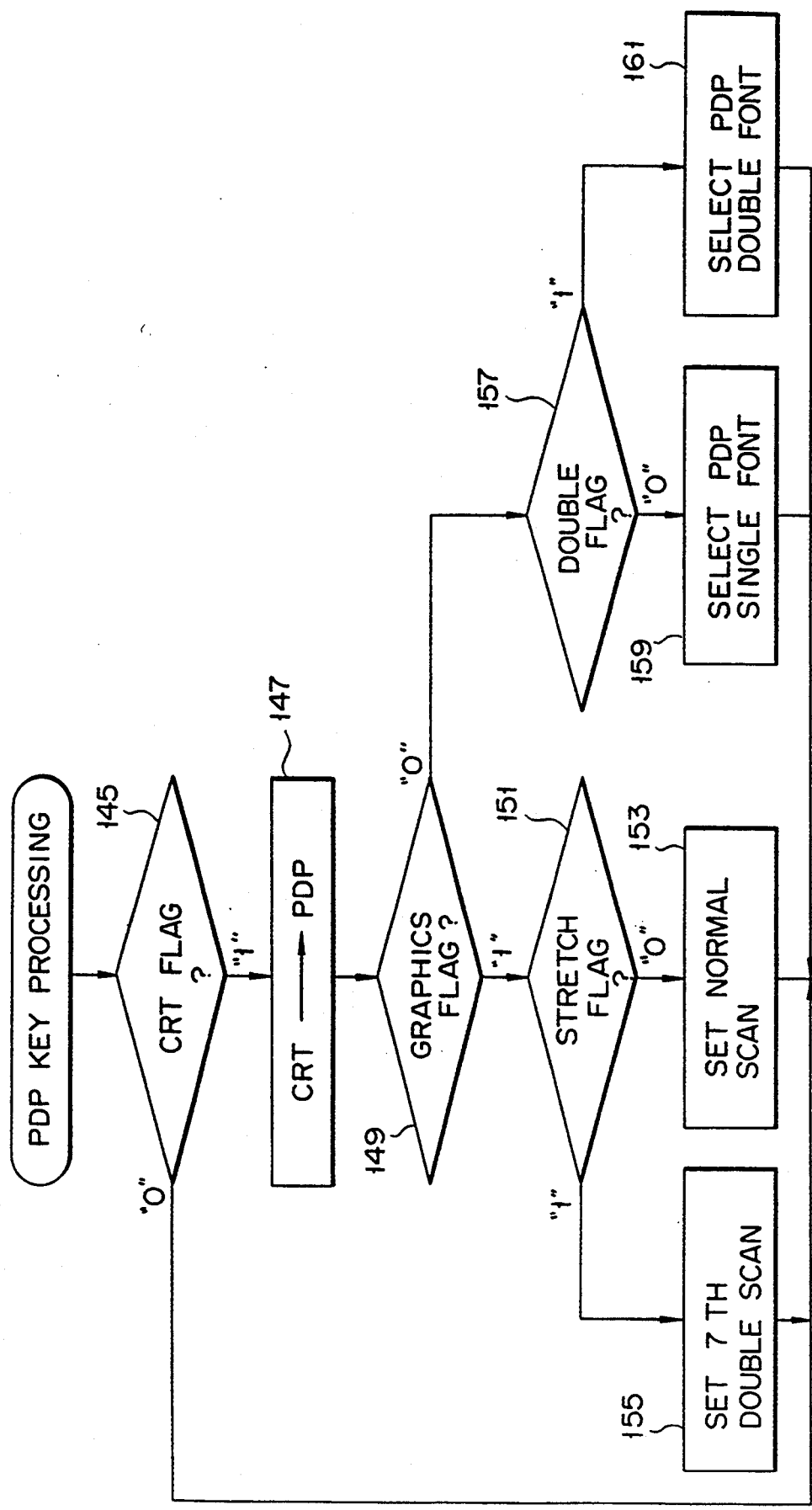
FIG. 7 is a flow chart showing in detail PDP key processing shown in FIG. 2C.

If it is determined in step 83 in FIG. 2C that the PDP key for instructing switching from the CRT mode to the PDP mode is operated, processing shown in FIG. 7 is executed. More specifically, if it is determined in step 145 in FIG. 7 that FC 9 is set to be "1" indicating the CRT mode, display switching processing from the CRT to the PDP including timing switching processing of CRTC 27 is executed in step 147. In step 149, CPU 1 refers to FG 13. If it is determined in step 149 that FG 13 is set to be "1", CPU 1 refers to FS 15 in step 151. If it is determined in step 151 that FS 15 is set to be "1" indicating the stretch mode (raster stretch mode), PDP display control in the stretch mode for PDP 23 is performed in step 155.

If it is determined in step 151 that FS 15 is set to be "0" indicating the normal mode, PDP display control in the normal mode for PDP 23 is performed in step 153.

If it is determined in step 149 that FG 13 is set to be "0" indicating the text mode, CPU 1 refers to FD 11 in step 157. If it is determined in step 157 that FD 11 is set to be "0" indicating a single font, CPU 1 selects a single font (blocks 4 through 7 in FIG. 12) as a display character font of PDP 23 in step 159. If it is determined in step 157 that FD 11 is set to be "1" indicating a double font, CPU i selects a double font (blocks 8 through 11 in FIG. 12) as a display character font of PDP 23 in step 161.

Figure 8:
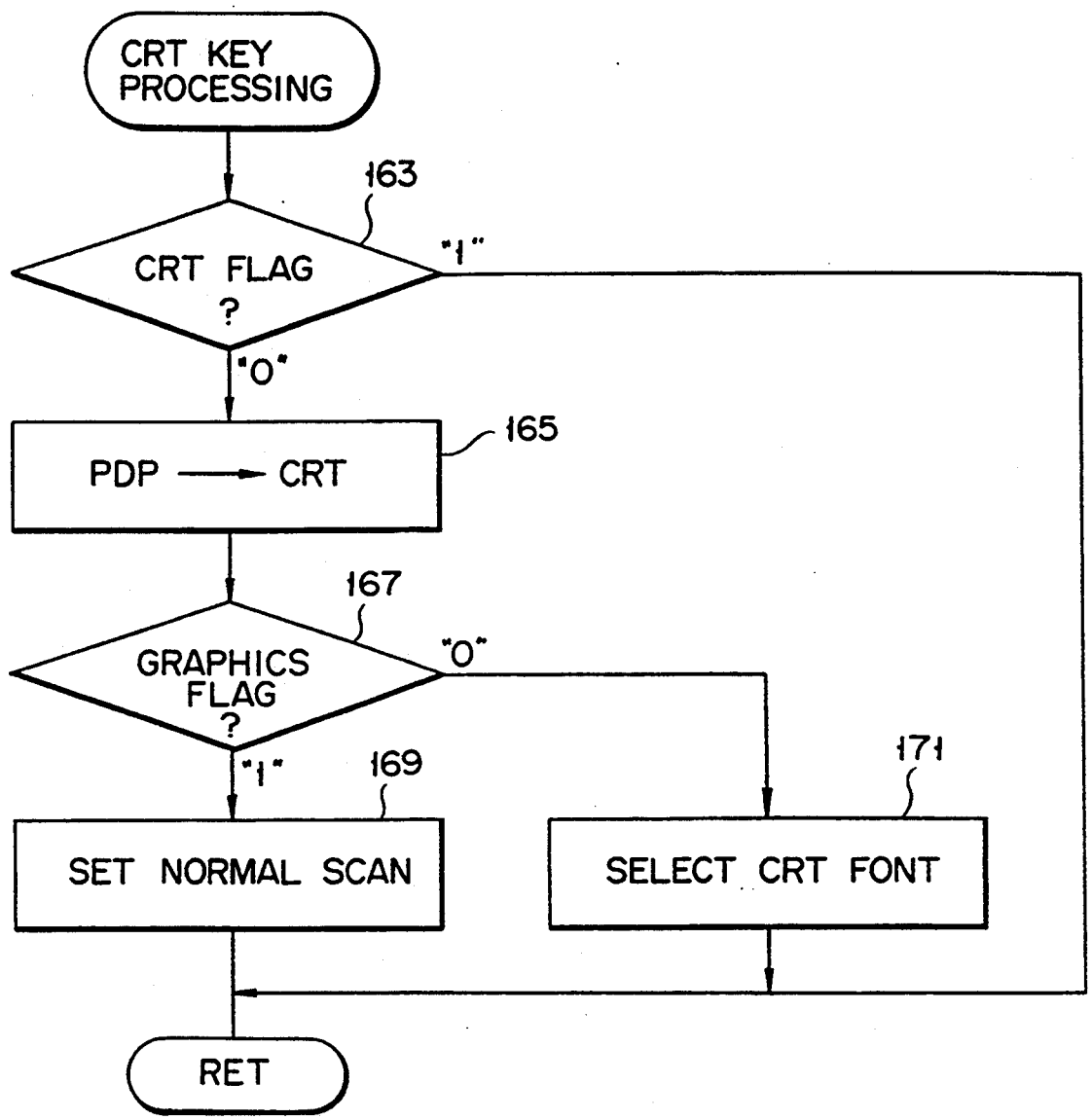
FIG. 8 is a flow chart showing in detail CRT key processing shown in FIG. 2C.

If it is determined in step 87 in FIG. 2C that the CRT key for instructing switching from the PDP mode the CRT mode is operated, CPU 1 executes a CRT key processing routine shown in FIG. 8. More specifically, if it is determined in step 163 in FIG. 8 that FC 9 is set to be "0" indicating the PDP mode, the flow advances to step 165, and display switching processing from the PDP to CRT including timing switching processing of CRTC 27 is executed. In step 167, CPU 1 refers to FG 13. If it is determined in step 167 that FG 13 is set to be "1" indicating the graphics mode, CRT graphics display control in the normal mode for CRT 25 is executed in step 169. However, if it is determined in step 167 that FG is set to be "0" indicating the text mode, a CRT font (blocks 0 through 3 in FIG. 12) is selected as a text display character font of CRT 25 in step 171.

Figure 9:
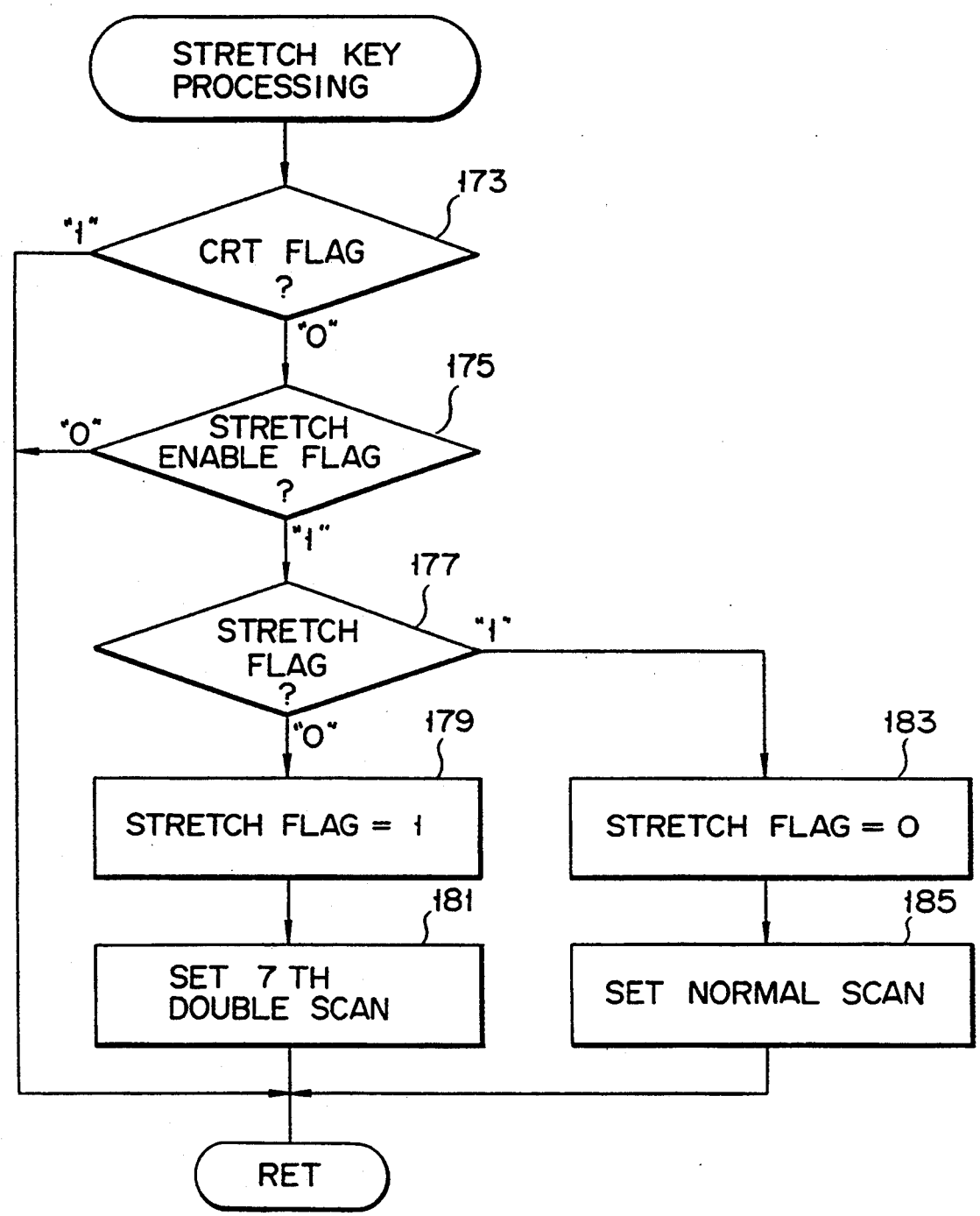
FIG. 9 is a flow chart showing in detail stretch key processing shown in FIG. 2C.

If it is determined in step 91 in FIG. 2C that the stretch key is operated, stretch key processing shown in FIG. 9 is executed. More specifically, if it is determined in step 173 in FIG. 9 that FC 9 is set to be "0" indicating the PDP mode and in step 175 that FE 17 is set to be "1" indicating the stretch enable mode, the flow advances the step 177. If CPU 1 determines in step 177 that FS 15 is set to be "0" indicating the normal mode, it rewrites FS 15 to be "1" indicating the stretch (raster stretch) mode in step 179. In step 181, CPU 1 double-scans a 7th dot, thereby performing raster stretch processing. As a result, PDP display control in the stretch mode for PDP 23 is executed.

However, if it is determined in step 177 that FS 15 is set to be "1", CPU 1 rewrites FS 15 to be "0" in step 183. In step 185, CPU 1 performs display control in the normal mode based on the content of FS 15.

In this manner, various display switching processing operations can be executed in response to key inputs.

In the above embodiment, the PDP can switch two types of display screen formats, and stretch processing from 8 dots to 9 dots is performed by 7th-dot double scan. However, the present invention is not limited to this. For example, three or more display modes, three or more display screen formats, or another stretch means may be employed.

What is claimed is:

1. A display control system for a computer system including a flat panel display apparatus and an optional cathode ray tube (CRT) display apparatus each having a display screen with the capability to selectively generate a display image including a plurality of raster lines and wherein said display control system is coupled to a video data storage device, and a display controller for retrieving line data from the video data storage device and for driving the flat panel display apparatus and the CRT display apparatus for displaying the line data on the display screens, the display control system having a current display mode selectable between a plurality of display modes, the display controller comprising:

stretch designation means for generating a stretch instruction to cause the display image of the flat panel display apparatus to be stretched;

first storage means for storing first data representing the stretch instruction;

second storage means for storing second data representing the current display mode;

determining means for determining, based on the first data stored in the first storage means and the second data stored in said second storage means, whether or not the display image of said flat panel display apparatus can be stretched when the display image is to be generated on said display screen of said flat panel display apparatus; and image stretch means for, when the determining means has determined that the display image can be stretched, repeatedly retrieving and displaying from the video data storage device, at evenly distributed intervals, line data corresponding to a specific raster line of the display screen of the flat panel display apparatus so as to add at least one extra line to said display image of said display screen, thereby stretching the display image.

2. The display control system according to claim 1, wherein said display controller includes means for driving said flat panel display apparatus and said CRT display apparatus in a plurality of display image types each having a different resolution.

3. The display control system according to claim 2, wherein the display image types each have a predetermined number of horizontal and vertical dots, and wherein said determining means further includes means for determining whether a resolution of a display image type of said flat panel display apparatus is not a full display screen when an application program for a CRT display apparatus has been executed using said flat panel display apparatus.

4. The display control system according to claim 1, wherein said stretch designation means comprises a keyboard including a stretch key that activates a function to indicate that the display screen of said flat panel display apparatus is to be stretched.

5. A display control system according to claim 4, wherein the determining means further includes means for determining whether the display image of said flat panel display apparatus is to be stretched when the stretch key is depressed.

6. A method of generating a display screen having a plurality of raster lines by a computer system including a video data storage device capable of holding display data, a flat panel display apparatus, and an optional cathode ray tube (CRT) apparatus, the computer system operating in a current display mode consisting of a selected one of a plurality of display modes, and the computer system including a display controller for driving the flat panel display apparatus and the CRT display apparatus, the method comprising the steps of:

generating a stretch instruction in response to a received request that a display screen of the flat panel display apparatus be stretched;

storing first data in first storage means representing the stretch instruction;

storing second data representing the current display mode in second storage means;

determining, based on the first and second data stored in the first and second storage means, whether or not the display image of said flat panel display apparatus can be stretched when the display image is to be generated on said display screen of said flat panel display apparatus; and reading and displaying display data from the video data storage device a plurality of times at evenly distributed intervals so as to add at least one extra pixel to said display image, thereby stretching said display image, if it is determined in the determining step that the display image can be stretched.

7. The method according to claim 6, wherein the determining step further includes the step of determining whether a resolution of a display image type of said flat panel display apparatus is not a full display screen when an application program for a CRT display apparatus has been executed using the flat panel display apparatus.

8. The method according to claim 6, wherein the computer system further includes a keyboard including a stretch key, and wherein the generating step includes the substep of:

receiving a signal indicating depression of the stretch key.

9. The method according to claim 8, wherein the determining step includes the substep of:

deciding whether the display image of the flat panel display apparatus is to be stretched in response to depression of the stretch key.

* * * * *